(12) United States Patent
Nakamura (10) Patent No.: US 9,778,892 B2
(45) Date of Patent: Oct. 3, 2017

(54) DEVICE CONTROL DEVICE, DEVICE CONTROL SYSTEM, DEVICE CONTROL METHOD, AND RECORDING MEDIUM

(71) Applicant: Seiko Epson Corporation, Tokyo (JP)

(72) Inventor: Hideo Nakamura, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 13/719,638

(22) Filed: Dec. 19, 2012

(65) Prior Publication Data

US 2013/0176589 A1    Jul. 11, 2013

(30) Foreign Application Priority Data

Dec. 19, 2011 (JP) ................................ 2011-277330

(51) Int. Cl.
*G06F 3/12* (2006.01)
*G06K 15/02* (2006.01)
*H04N 5/00* (2011.01)
*H04N 7/00* (2011.01)

(52) U.S. Cl.
CPC .......... *G06F 3/1297* (2013.01); *G06F 3/1206* (2013.01); *G06F 3/1228* (2013.01); *G06F 3/1247* (2013.01); *G06F 3/1288* (2013.01)

(58) Field of Classification Search
CPC .................................. G06F 21/20; G06F 9/54
USPC ........ 358/1.15, 468, 406, 407; 715/200, 738
See application file for complete search history.

(56) References Cited

U.S. PATENT DOCUMENTS

| 5,303,336 | A | * | 4/1994 | Kageyama | ............ | G06F 3/1293 358/1.13 |
| 5,946,105 | A | * | 8/1999 | Oishi | ................. | H04N 1/00204 358/1.11 |
| 6,346,990 | B1 | * | 2/2002 | Watanabe | ............. | G06F 17/211 358/1.11 |
| 6,535,652 | B2 | * | 3/2003 | Nakatsuka | .......... | G06F 17/3025 358/403 |
| 6,691,187 | B1 | * | 2/2004 | Schwerin | ............... | G06K 15/00 710/14 |

(Continued)

FOREIGN PATENT DOCUMENTS

| JP | 03-279998 A | 12/1991 |
| JP | 2001-232904 A | 8/2001 |

(Continued)

*Primary Examiner* — Akwasi M Sarpong
(74) *Attorney, Agent, or Firm* — Nutter McClennen & Fish LLP; John J. Penny, Jr.

(57) ABSTRACT

A client terminal can control a printer even when the network connection to a web server is interrupted, and can convert character codes using a simple configuration. The client terminal having a standard web browser and connected to a web server and a printer has a web page acquisition unit that uses the web browser to acquire a web page with an embedded printer control script from the web server; a web page display unit that displays the acquired web page and run the printer control script; a character code conversion unit that uses the printer control script to convert script character codes to printer character codes, which is a character code for the device; and a command transmission unit that sends a command containing the converted printer character codes to the printer.

16 Claims, 6 Drawing Sheets

(56) References Cited

U.S. PATENT DOCUMENTS

| | | | | |
|---|---|---|---|---|
| 2007/0053010 A1* | 3/2007 | Gaarder | ............ | H04N 1/00352 |
| | | | | 358/474 |
| 2011/0083067 A1* | 4/2011 | Shim | ................ | G06F 17/30899 |
| | | | | 715/200 |
| 2011/0122438 A1* | 5/2011 | Someya | ................ | G06F 3/1208 |
| | | | | 358/1.15 |
| 2013/0033720 A1* | 2/2013 | Hirayama | ............. | G06F 3/1206 |
| | | | | 358/1.14 |

FOREIGN PATENT DOCUMENTS

| | | | | |
|---|---|---|---|---|
| JP | 2005-050047 A | 2/2005 | | |
| JP | 2006-252330 A | 9/2006 | | |
| JP | 2009-015748 | * 1/2009 | ............... | G06F 9/54 |
| JP | 2009-015748 A | 1/2009 | | |
| JP | 2011-108171 A | 6/2011 | | |

* cited by examiner

PRINTER CHARACTER STRING

PATTERN 1: UNICODE CHARACTER STRING IN ANK CHARACTER CODE ORDER var cp437= "ÇüéâäàåçêëèïîìÄÅÉæÆôöòûùÿÖÜ¢£¥Pts ƒ";

PATTERN 2: UNICODE CHARACTER STRING IN SHIFT-JIS CHARACTER CODE ORDER var shift_jis= "亜唖娃阿哀愛挨姶逢葵茜穐悪握渥旭葦芦鯵梓圧斡扱宛姐虻飴絢綾鮎岾或栗";

FIG. 3A

MAPPING CHARACTERS IN A PRINTER CHARACTER STRING TO PRINTER CHARACTER CODES

PATTERN 1: MAPPING WITH AN ASSOCIATIVE ARRAY table [ ' ä ' ] = 0 x 84 ;
  81   82   83

PATTERN 2: MAPPING WITH OBJECT PROPERTIES table . ä = 0 x 84 ;
 85  86   87

DEVICE CONTROL DEVICE, DEVICE CONTROL SYSTEM, DEVICE CONTROL METHOD, AND RECORDING MEDIUM

Priority is claimed under 35 U.S.C. §119 to Japanese Application No. 2011-277330 filed on Dec. 19, 2011, which is hereby incorporated in its entirety.

BACKGROUND

1. Technical Field

The present invention relates to a device for controlling another device, a device control system, a device control method, and a recording medium storing a program enabling operating a device without using a device driver.

2. Related Art

A printing control system including a network-connected application server that runs an application program, client terminal that sends requests to the application program on the server, printer that prints based on print commands from the client terminal, and printer control server that controls the printer is known from the literature. See for example, Japanese Unexamined Patent Appl. Pub. JP-A-2009-15748. The printer control server in this printing control system functions as the driver of the printer ("printer driver" below), and can therefore operate the printer without installing a printer driver on the client terminal.

In the printing control system described in JP-A-2009-15748, the printer control server converts the universal character codes used by the application server to the character code set used by the printer. As a result, the printer cannot be controlled when the client terminal and the printer control server are offline. Character code conversion could conceivably be done by the printer, but this requires significant processing power in the printer, limiting the printers in which this method can be used.

SUMMARY

The present invention is directed to solving the foregoing problem, and an object of the invention is to provide a device for controlling another device, referred to below as a device control device, a device control system, a device control method, and a recording medium storing a program enabling character code conversion and controlling a device even when not connected to a network by means of a simple configuration.

A device control device according to at least one embodiment of the invention having a standard web browser and connected to a web server and a device includes: a web page acquisition unit that uses the web browser to acquire a web page and a device control script for controlling the device from the web server; a web page display unit that uses the web browser to display the acquired web page and run the device control script; a character code conversion unit that uses the device control script to convert a script character code, which is a character code in the device control script, to a device character code, which is a character code for the device; and a command transmission unit that uses the device control script to send a command containing the converted device character code to the device.

A device control method according to at least one embodiment of the invention using a standard web browser, the web browser executes a web page acquisition step of acquiring a web page and a device control script for controlling a device from a web server, and a web page display step of displaying the acquired web page and running the device control script; and the device control script executes a character code conversion step of converting a script character code, which is a character code in the device control script, to a device character code, which is a character code for the device, and a command transmission step of sending a command containing the converted device character code to the device.

These aspects of the invention enable the conversion of character codes using a device control script that can be run by a standard web browser (a plugin-free web browser that does not support plugins) without requiring a plugin or device driver. Because there is therefore no need for device-side character code conversion, even simple devices with few functions can be used. The invention can also be used on terminals, such as smartphones and tablets, that have a standard web browser. Because a device driver is not needed, a character code conversion library is not needed in hardware or in the operating system, and development costs can be reduced. Devices can also be controlled when offline and not connected to the web server or network because character code conversion is handled by the web browser (device control device). Character code conversion that is independent of a web server is particularly useful when the device control device is capable of using web pages while offline (has the ability to run web applications when offline).

Preferably, the device control device also has a table generating unit that generates a character code conversion table using the device control script, and the character code conversion unit converts the character code by referencing the character code conversion table.

By using a character code conversion table, this aspect of the invention enables the conversion of character codes with few calculations. Having a table generating unit also enables dynamically generating the character code conversion table according to the character code set (character set) of the device. A greater range of devices can therefore be used because a wide range of character code sets can be used.

Further preferably in a device control device according to another aspect of at least one embodiment of the invention, the table generating unit generates the character code conversion table by mapping the characters contained in a device character string storing the script characters in the device character code sequence to the device character codes calculated from the location of each character in the device character string.

This aspect of the invention enables easily the adding and deleting of characters according to the specific device because the character code conversion table is compiled with device character strings stored in the device character code order. More specifically, because the order of the characters in the character code table defined in the device specifications conforms to the character code set of the device, a device character string stored in the device character code order can be created easily for compatibility with a new model, for example, by referencing the specifications of that model.

Further preferably in a device control device according to another aspect of at least one embodiment of the invention, the character code conversion table stores a map of associative array keys and element values, or object property names and property values.

This configuration minimizes the size of the script file. As a result, because a large, complicated device control script is not needed, a drop in the web page refresh rate or responsiveness to user operations can be prevented.

Yet further preferably, the device control device according to another aspect of at least one embodiment of the invention also has a response receiving unit that receives response information from the device using the device control script; and a character code reverse conversion unit that uses the device control script to convert the device character codes contained in the response information to the script character codes.

This aspect of the invention converts response information such as a status report or error information sent from the device to script character codes, and can thereby display the information on the web page for the user, or prompt the user to take specific action such as device maintenance or repeating an operation. The web server can also use the information to record an operating log of system operations.

Yet further preferably, in a device control device according to another aspect of the invention, the character code reverse conversion unit converts character codes by extracting the script character code at the location calculated based on the device character code from the device character string.

This aspect of the invention enables the elimination of a character code conversion table for reverse conversions, thus further reducing the size of the script file.

In a device control device according to another aspect of at least one embodiment of the invention, the device is a printer; and the device control script is a printer control script.

This aspect of the invention enables applying the invention to a device for controlling printers.

Another aspect of at least one embodiment of the invention is a device control system including the device control device described above, a web server, and a device.

Another aspect of at least one embodiment of the invention is a non-transitory, tangible computer-readable recording medium storing a program that causes a computer to execute the character code conversion step and the command transmission step in the device control method described above.

These aspects of the invention enable rendering a device control system and a device control method that can control a device when the network connection is interrupted, and can convert character codes using a simple configuration.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of a device control device, device control system, device control method, and a recording medium according to the present invention are described below with reference to the accompanying figures. This embodiment describes a printer control system that can operate a printer using a web browser without installing a dedicated printer driver on the client terminal.

Figure 1:
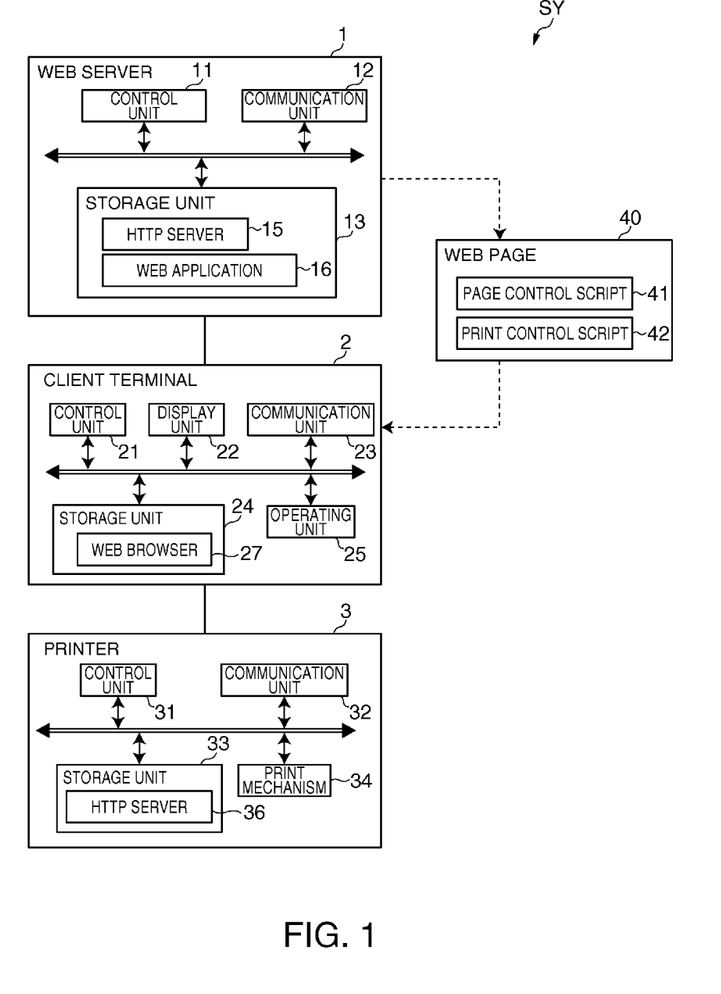
FIG. 1 is a block diagram of a printer control system according to a preferred embodiment of the invention.

FIG. 1 is a block diagram of a printer control system SY (device control system) according to this embodiment of the invention. As shown in the figure, the printer control system SY includes a web server 1, a client terminal 2 (device control device), and a printer 3 (device). The web server 1 and client terminal 2 are connected over a network such as the Internet. The client terminal 2 and printer 3 are connected over a network such as a wired or wireless LAN. The client terminal 2 is a POS (point of sale) terminal connected to a cash register in a retail store, for example, and the printer 3 is a receipt printer that prints sales receipts.

Note that the system diagram shown in FIG. 1 shows only one web server 1, client terminal 2, and printer 3 each, but the invention is not so limited and configurations having a plurality of client terminals 2 connected to a single web server 1, or a plurality of printers 3 connected to a single client terminal 2, are also conceivable and within the scope of the invention.

The web server 1 has the hardware configuration of a typical computer, including a control unit 11, communication unit 12, and storage unit 13. The control unit 11 includes a CPU (central processing unit), ROM (read-only memory) and RAM (random access memory). The storage unit 13 is a hard disk drive, for example, and stores a HTTP server 15 and web application 16.

The communication unit 12 is an interface for communicating with the client terminal 2 (web browser 27). Communication between the web server 1 and client terminal 2 is controlled by the HTTP server 15 using the HTTP (Hypertext Transfer Protocol). More specifically, the web server 1 receives HTTP requests from the client terminal 2 (web browser 27), and based on the URL (Uniform Resource Locator) contained in the HTTP request sends a web page 40 from the web application 16 to the client terminal 2.

As described in detail below, the web page 40 contains a page control script 41 (written in JavaScript (R)) for controlling the web page 40, and a print control script 42 (written in JavaScript (R)) for controlling printing. The client terminal 2 executes the printing process by running the print control script 42 (in the web page 40) through the web browser 27.

The printer 3 includes a control unit 31, communication unit 32, storage unit 33, and print mechanism 34. The control unit 31 includes a CPU, and controls printer 3 operation. The storage unit 33 is nonvolatile memory (such as flash ROM), for example, and stores an HTTP server 36.

The print mechanism 34 can include a printhead, paper feed mechanism, and paper cutter mechanism, and prints as controlled by the control unit 31. An inkjet, laser, or other desirable printing method can be used.

The communication unit 32 is an interface for communicating with the client terminal 2 (web browser 27). Communication between the printer 3 and client terminal 2 (web browser 27) is controlled by the HTTP server 36 using HTTP. More specifically, when print data is sent from the client terminal 2 to the service endpoint address (a URI (Uniform Resource Identifier) such as http://x.x.x.x/) assigned to the printer 3, the printer 3 receives the print data and drives the print mechanism 34 to print based on the received print data.

The client terminal 2 includes a control unit 21, display unit 22, communication unit 23, storage unit 24, and operating unit 25. The control unit 21 includes a CPU, and controls client terminal 2 operation.

The display unit 22 displays the web page 40 acquired (downloaded) by the web browser 27 on the web browser 27, and displays various prompts and configuration screens in response to web browser 27 operations. The operating unit 25 is used to perform operations on the web page 40 displayed by the web browser 27, including requesting printing. Note that the display unit 22 and operating unit 25 could be separate hardware devices, or rendered in unison by a touch panel, for example.

The communication unit 23 is an interface for communicating with the web server 1 and printer 3. As described above, the client terminal 2 communicates with the web server 1 and printer 3 through the web browser 27.

The storage unit 24 is a hard disk drive, for example, and stores the web browser 27 application. This web browser 27 can be a simple browser (standard browser) that does not support plugin modules. The control unit 21 accesses the web server 1 through the communication unit 23 and acquires the web page 40 from the web application 16 using this web browser 27.

As described above, the web page 40 contains a page control script 41 and print control script 42. When a user print command operation (such as clicking a print button) is received by the page control script 41 contained on the web page 40, the web browser 27 executes the print control script 42 contained on the same web page 40 and runs the character code conversion process, generates print data, and outputs to the printer 3 (to the service endpoint of the printer 3). The service endpoint of the printer 3 to which the print data is sent is specified in the print control script 42.

Note that the client terminal 2 could be any computing device on which the web browser 27 runs, including smartphones, tablets, and personal computers.

Figure 2A:
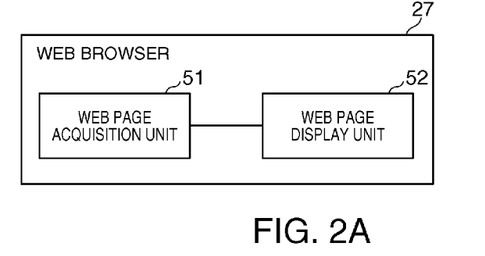
FIGS. 2A and 2B are function block diagrams of the printer control system.

The functional configuration of the printer control system SY, particularly the functions of the web browser 27 and print control script 42, is described next with reference to FIG. 2A and FIG. 2B. FIG. 2A shows the web browser 27. The main functional units of the web browser 27 include a web page acquisition unit 51 and a web page display unit 52.

The web page acquisition unit 51 accesses the web server 1 (web application 16), and acquires the desired web page 40 (the web page 40 containing the page control script 41 and print control script 42).

Note that the web page 40 and print control script 42 could be acquired separately instead of simultaneously. The print control script 42, which is acquired later, could also be dynamically embedded in the web page 40, which is acquired first. When the web page 40 and print control script 42 are acquired separately, the web server 1 from which the web page 40 is acquired and the web server 1 from which the print control script 42 is acquired do not need to be the same.

The web page display unit 52 displays the web page 40, and runs the page control script 41 and print control script 42 embedded in the web page 40.

Figure 2B:
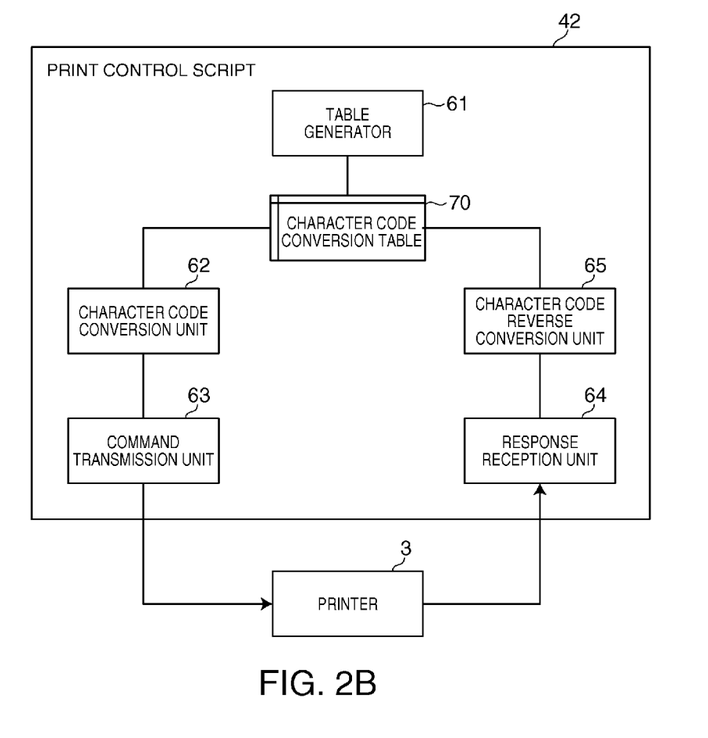

FIG. 2B is a functional block diagram of the print control script 42. The main components of the print control script 42 include the table generator 61, a character code conversion unit 62, a command transmission unit 63, a response reception unit 64, and a character code reverse conversion unit 65.

Figure 5:
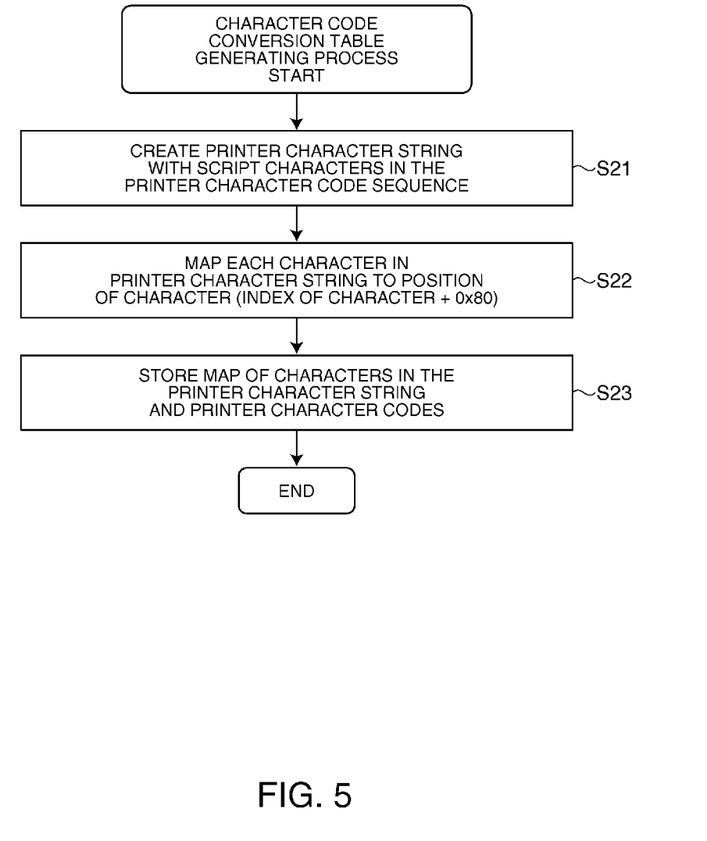
FIG. 5 is a flow chart of the character code conversion table generating process.

The table generator 61 generates the character code conversion table 70 used in the character code conversion process (character code conversion table generating process, see FIG. 5). More specifically, the table generator 61 generates the character code conversion table 70 by sequentially storing the script character codes (universal character codes such as Unicode (R)), which are the character codes in the print control script 42, and the printer character codes (device character codes), which are the character codes used by the printer 3. The script character codes arranged in the printer character code sequence are referred to below as a "printer character string" (device character string). The character code conversion table 70 thus correlates the characters contained in the printer character string with the printer character codes calculated from the position of each character in the printer character string.

Figure 3A:
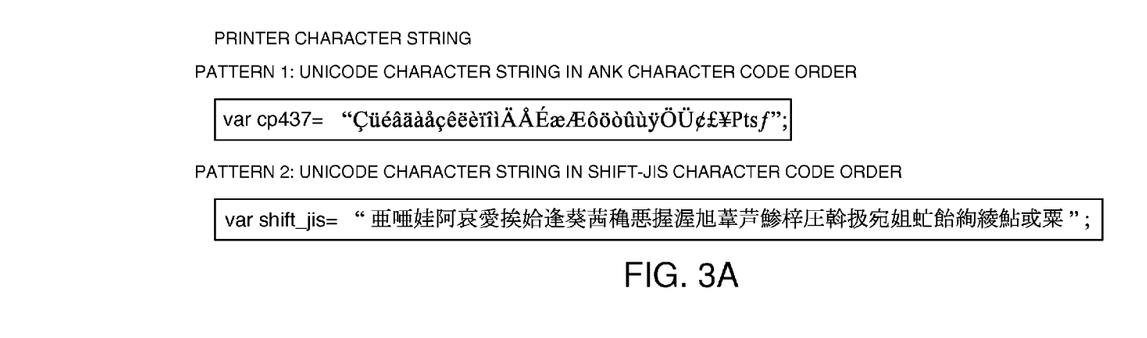
FIGS. 3A and 3B describe examples of printer character strings, and the correlation between the characters contained in the printer character string and printer character codes.

FIG. 3A describes an example of a printer character string.

Pattern 1 in FIG. 3A shows a Unicode (R) string arranged in the ANK (Alphabetic Numeric and Kana) character code sequence (JIS X0201) as an example of a printer character string. More specifically, the string shown in the rectangular box is a printer character string.

Pattern 2 in FIG. 3A shows a Unicode (R) string in the Shift JIS character code sequence as another example of a printer character string.

Printer character strings are thus written according to a specific character code set.

Figure 3B:
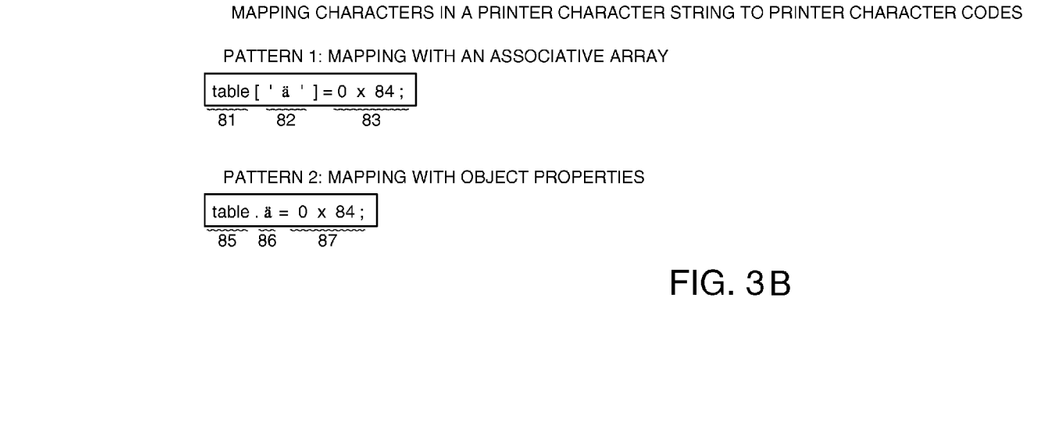

The character code conversion table 70 also stores a map of associative array keys and element values, or the names of object properties and property values. FIG. 3B shows an example of a character in a printer character string mapped to a printer character code.

Pattern 1 in FIG. 3B shows an associative array map for the Unicode character ä (a—umlaut) where reference numeral 81 denotes an associative array, reference numeral 82 denotes the key of the associative array, and reference numeral 83 denotes the value of the element of the associative array.

Pattern 2 in FIG. 3B shows an object property map for the Unicode character ä (a—umlaut) where reference numeral 85 denotes an object, reference numeral 86 denotes the name of the object property, and reference numeral 87 denotes the value of the object property.

The table generator 61 stores the generated character code conversion table 70 in a storage object using a web storage or other API (application program interface). There is, therefore, no need to generate the character code conversion table 70 each time the web page 40 is displayed when a web page 40 from the same domain is displayed because the character code conversion table 70 is not deleted (because the table is saved in web storage). The table generator 61 thus generates the character code conversion table 70 only the first time the web page 40 is displayed.

Figure 6A:
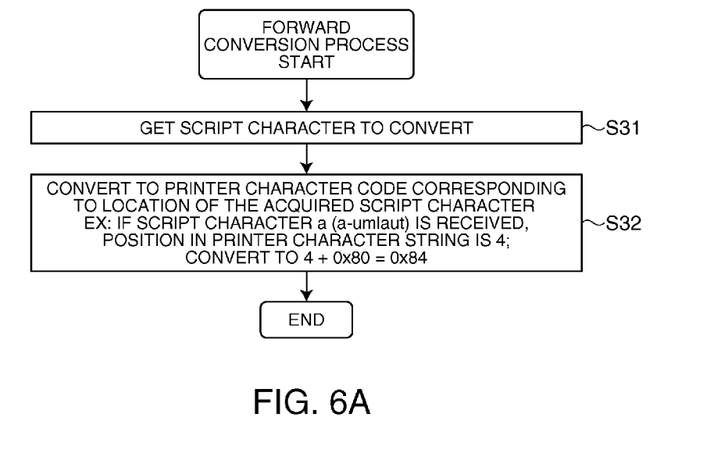
FIGS. 6A and 6B are flow charts of the character code conversion process (forward conversion process, reverse conversion process).

Returning to FIG. 2B, the character code conversion unit 62 references the character code conversion table 70 and converts the script character codes to printer character codes (forward conversion process, see FIG. 6A). The command transmission unit 63 then sends a command containing the resulting printer character codes (such as an ESC/POS command added to the printer character codes) to the printer 3.

The response reception unit 64 receives a response including status or error information from the printer 3. The character code reverse conversion unit 65 then converts the printer character codes contained in the response to script character codes (reverse conversion process, see FIG. 6B) by extracting the script character codes stored at the location calculated based on the printer character codes from the character code conversion table 70 (printer character strings).

The printing process is described next referring to the flowchart in FIG. 4. When the client terminal 2 (web browser 27) gets a web page 40 from the web server 1 (S01), the client terminal 2 displays the web page 40 on the display unit 22 and runs the print control script 42 (S02). The print control script 42 determines if the web page 40 was displayed for the first time (S03), and if it was (S03 returns Yes), executes the character code conversion table generating process (S04). If the web page 40 was not displayed for the first time (S03 returns No), the print control script 42 skips step S04 and determines if a print command was asserted by the user (S05).

If a print command from the user is detected (S05 returns Yes), the forward conversion process is executed (S06). More specifically, the client terminal 2 converts the script character codes to printer character codes, and sends a command containing the resulting printer character codes to the printer 3 (S07).

A response from the printer 3 is then received (S08), and the client terminal 2 applies the reverse conversion process to the response information (S09). More specifically, the client terminal 2 converts the printer character codes to script character codes.

Finally, the web browser 27 displays the converted response information (script character codes) on the web page 40 (S10). As a result, the client terminal 2 can display printer 3 status and error information for the user, and prompt actions such as printer 3 maintenance, including loading receipt paper, or reprinting as needed. Parallel to step S10, the converted response information may also be reported to the web server 1 and system operating information (an operating log) stored on the web server 1.

The character code conversion table generating process is described next with reference to the flow chart in FIG. 5, which is a flow chart of the subroutine performed in step S04 in FIG. 4.

The print control script 42 generates the printer character string by arranging the script characters in the printer character code sequence (S21). More specifically, the print control script 42 generates a printer character string (script character string) corresponding to the character code set of the printer 3 (the ANK character code set (pattern 1), or Shift-JIS character code set (pattern 2)) as shown in the boxes in FIG. 3A.

The print control script 42 then maps the characters in the printer character string to the storage location of each character (S22). In this example, 0×80 is added to the index of each character (position in the printer character string) to get the storage location of each character. The results from step S22 are then stored in the character code conversion table 70 (S23). The results of step S22 indicate the mapping of associative array keys and values (pattern 1), or object property names and property values (pattern 2), as shown in the boxes in FIG. 3B.

The character code conversion process is described next with reference to the flow chart in FIG. 6A and FIG. 6B. FIG. 6A is a flow chart of the forward conversion subroutine performed in step S06 in FIG. 4.

In FIG. 6A, the print control script 42 acquires the script characters to be converted (S31), and converts the script characters to the printer character codes mapped to the storage locations of the acquired script characters (S32). For example, if the script character string shown in pattern 1 in FIG. 3A is generated as the printer character string, and the script character ä (a—umlaut) is received, the script character is converted to the printer character code 0x84 (4th position+0x80=0x84) because the character ä (a—umlaut) is 4th in the printer character string.

Figure 4:
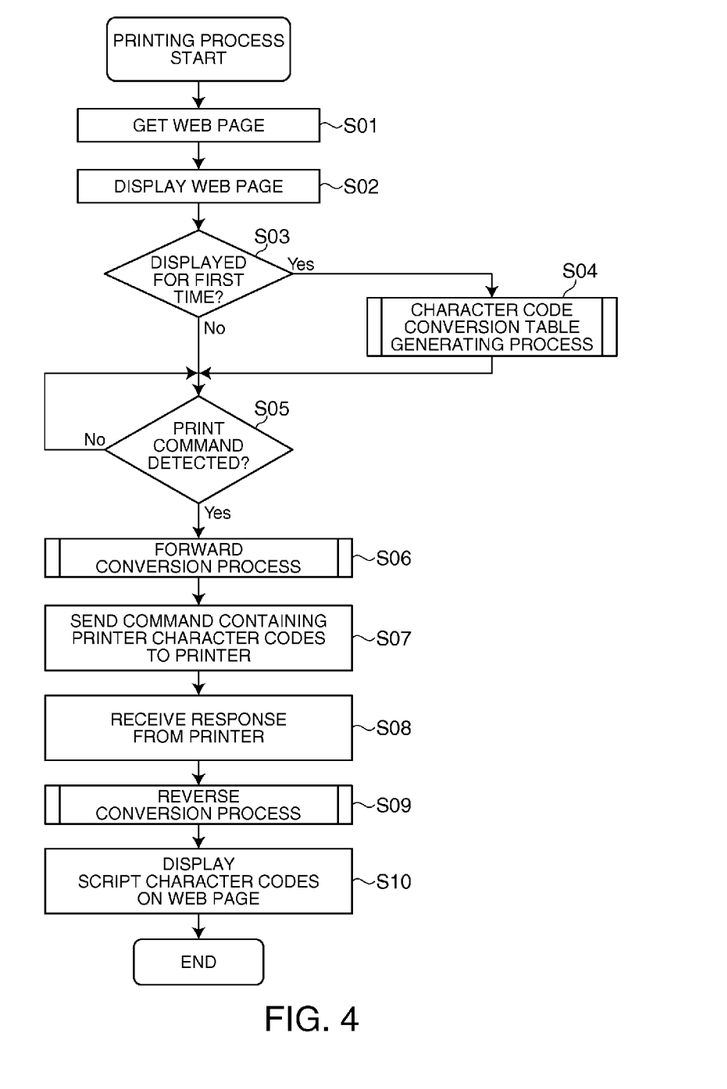
FIG. 4 is a flow chart of the printing process.
Figure 6B:
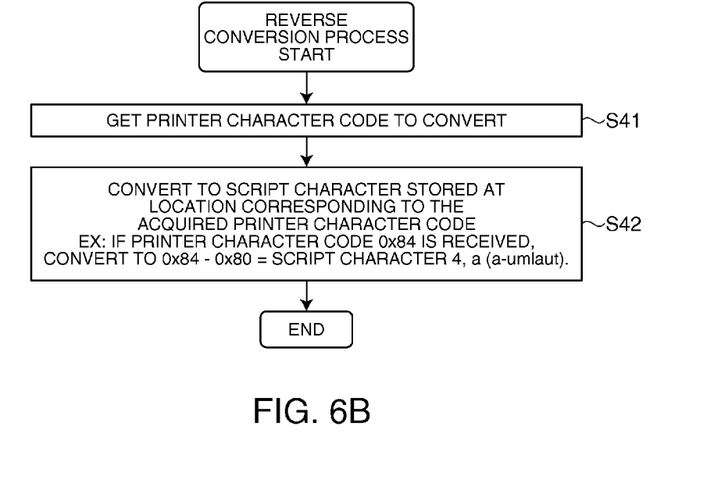

FIG. 6B is a flow chart of the reverse conversion subroutine corresponding to step S09 in FIG. 4. When a printer character code (response information) to be converted is acquired (S41), the print control script 42 converts the printer character code to the script character stored at that address (S42). For example, if the script character string shown in pattern 1 in FIG. 3A was generated as the printer character string, and the printer character code 0x84 is acquired, the printer character code is converted to the script character ä (a—umlaut) corresponding to the 4th character (0x84−0x80=4) in the printer character string.

As described above, this embodiment of the invention can convert character codes using a print control script 42 that can be run in a standard web browser 27 without using a plugin or printer driver. As a result, code conversion can be easily accomplished using a terminal having a web browser 27 that does not support plugins. In addition, because a printer driver is not needed, a character code conversion library does not need to be provided in hardware or the operating system, and the development cost can be reduced. Furthermore, because character code conversion can be done by the web browser 27, the printer 3 can be controlled even when the network connection to the web server 1 is interrupted. More specifically, the invention is particularly useful if the client terminal 2 supports an API that enables using the web page 40 while offline because the client terminal 2 can run the code conversion process without accessing the web server 1. Yet further, the invention is not limited to printers 3 with particular specifications, that is, can even be used with simple, low performance printers 3 because code conversion is handled by the web browser 27.

The print control script 42 also has a table generating function, and can therefore generate a character code conversion table 70 corresponding to the character code set by the printer 3. Furthermore, because the character code conversion table 70 manages the script characters using printer character strings stored in the printer character code sequence, characters can be easily added and deleted to match the specific printer 3. In addition, by using a character code conversion table 70, the computational complexity of the character code conversion process for one character (forward conversion process and reverse conversion process) is O(1) in the best scenario. More specifically, the amount of data is the number of characters in the character code conversion table 70, the computational complexity is the number of steps required to convert a character code, and the number of steps required for character code conversion does not increase even if the number of characters in the character code conversion table 70 increases. Therefore, even if the number of characters in the character code conversion table 70 increases, the web page 40 refresh rate will not drop, and responsiveness to user operations does not decrease.

Because the print control script 42 also has a reverse conversion function for response information sent from the printer 3, response information can be displayed on the web page 40 to inform the user or prompt action such as printer maintenance or repeating some operation. Furthermore, because the character code conversion table 70 is also used for reverse conversion (because two separate conversion tables are not required for the forward conversion process and reverse conversion process), the script file can be made even smaller.

The table generator 61 generates the character code conversion table 70 only the first time the web page 40 is loaded in the embodiment described above, but the character code conversion table 70 could be created each time the web page 40 is loaded. This configuration enables trouble-free operation even when there is no web storage or other function for storing data in the web browser 27. More specifically, the web browser 27 stops executing scripts and clears the script execution state and variables when the web page 40 is changed or refreshed, but there is no interference with printer 3 control because the character code conversion table 70 is created each time the web page 40 is displayed.

Components of the printer control system SY described above (such as the web browser 27 and print control script 42) can also be provided as a program. This program can also be stored on a suitable non-transitory, tangible recording medium, including CD-ROM and flash memory media. More specifically, a program that causes a computer to function as the components of the foregoing printer control system SY, and a non-transitory, tangible recording medium storing this program, are also included in the scope of the present invention.

A printer 3 (receipt printer) is used as an example of a device in the embodiment described above, but the invention also can be applied to printing devices other than receipt printers, including label printers. The invention is also not limited to printers 3, and can be applied to other electronic devices that require character code conversion. Examples of such devices comprise devices with an embedded display device. The invention is particularly useful with low performance devices that cannot perform the character code conversion process alone.

A main application of the invention is to change settings (change displayed and recorded content), and uses the client terminal 2 (web browser 27) as a configuration terminal. Specific devices for which the invention is particularly useful comprise POS terminal peripherals such as customer display devices, card readers, handheld scanners, electronic POP devices, electronic shelf labels, and order display devices. Commercial applications comprise vending machines, electronic bulletin boards, air conditioning equipment, kitchen equipment, and surveillance equipment. Consumer product applications comprise video equipment, audio devices, digital appliances including LCD televisions, recorders, and digital cameras, telephones, and timepieces.

JavaScript (R) is used as an example of a script language in the foregoing embodiment, but the invention is not so limited and can also be used with other programming languages.

The invention being thus described, it will be apparent to those skilled in the art that it may be varied in many ways. Such variations are not to be regarded as a departure from the spirit and scope of the invention, and all such modifications as would be apparent to one skilled in the art are intended to be included within the scope of the following claims.

What is claimed is:

1. A printer control system for controlling a printer, the printer control system comprising:
  a printer; and
  a processor coupled with the printer and configured to implement:
  a web browser configured to:
    (a) access a web server to acquire a web page stored in the web server;
    wherein:
    the webpage contains a control script that includes a page control script, for controlling the webpage, and a print control script, for controlling printing;
    the page control script is configured to receive a print command operation requesting printing using the printer; and
  the webpage is configured to respond to the print command operation by executing the print control script, the print control script including:
    a table generator that generates a character code conversion table, when the webpage is first displayed, by sequentially storing character codes included in the print control script and character codes used by the printer, the character code conversion table correlating a device character string, including codes used by the printer, with character codes calculated from position of each character in the device character string;
    and
    a character code convertor that references the character code conversion table to convert the character codes in the print control script to the calculated character codes; and
    a command transmitter that sends a command containing the converted character codes to the printer;
      (b) generate print data based on the converted character codes; and
      (c) output the print data to the printer;
  wherein the printer is configured to print using the print data.

2. The control system of claim 1 wherein the table generator stores the character code conversion table in a storage object when the acquired webpage is first displayed.

3. The control system of claim 1 wherein the print control script generates the device character string by arranging script characters according to sequence of characters in the device character string.

4. The control system of claim 1 wherein the character code conversion table is configured to store at least one of a map of associative array keys and element values or object property names and property values.

5. The control system of claim 1 further comprising:
  a response receiver configured to receive a response from the printer; and
  a character code reverse convertor configured to convert character codes contained in the response to the character codes of the print control script.

6. The control system of claim 5 wherein the character code reverse conversion convertor is configured to convert the character codes in the response by extracting character codes, stored at a location calculated based on the character codes, from the character code conversion table.

7. The control system of claim 1 wherein the printer is a label printer and further including displaying the webpage acquired by the web browser.

8. A printer control system comprising:
  the control system of claim 1;
  the web server; and
  the printer.

9. A printer control method for controlling a printer, the method comprising:
  accessing a web server using a web browser to acquire a web page stored in the web server the webpage including a page control script, for controlling the webpage, and a print control script, for controlling printing;
  receiving, using the print control script, a print command operation requesting printing using the printer;
  executing, using the webpage, the print control script in response to the print command operation, the print control script, upon execution, generating a character code conversion table by sequentially storing character codes included in the print control script and character codes used by the printer when the webpage is first displayed, the character code conversion table correlating a device character string, including codes used by the printer, with device character codes calculated from position of each character in the device character string;

converting the character codes in the character codes in the print control script to the calculated device character codes by referencing the character conversion table;

sending a command containing the converted character code to the printer;

generating print data based on the converted character codes and outputting the generated print data to the printer; and printing, using the printer, based on the print data.

10. The control method of claim 9 further comprising storing the character code conversion table in a storage object when the acquired webpage is first displayed.

11. The control method of claim 9 further comprising generating the device character string by arranging script characters according to the sequence of characters in the device character string.

12. The control method of claim 9 further including storing, by the character code conversion table, at least one of a map of associative array keys and element values or object property names and property values.

13. The control method of claim 9 further including:
receiving a response from the printer; and
converting the character codes contained in the response to the character codes in the control script.

14. The control method of claim 13 further comprising converting the character codes in the response to character codes of the print control script by extracting character codes, stored at a location calculated based on the device character codes, from the character conversion table.

15. A non-transitory computer-readable recording medium storing a program that causes a computer to convert the control script character codes of claim 9 to the calculated device character codes by referencing the character conversion table and send the command containing the converted device character code to the printer.

16. A printer control system for controlling a printer, the device control system comprising a processor configured to operate as:

a web browser configured to access a web server to acquire a web page stored in the web server the webpage containing a page control script, for controlling the webpage, and a print control script, for controlling printing, the control script including a page control script for controlling the webpage and a print control script for controlling printing, the page control script being configured to receive a print command operation requesting printing using the printer and the webpage being configured to respond to the print command operation by executing the print control script, the print control script including: a table generator that generates a character code conversion table when the webpage is first displayed by sequentially storing character codes included in the print control script and character codes used by the printer, the character code conversion table correlating a device character string, including codes used by the printer, with device character codes calculated from position of each character in the device character string;

a display configured to use the web browser to display the acquired web page and execute the control script; and a print control script configured to reference the character code conversion table to convert the character codes in the print control script to the calculated character codes, and that uses the device control script to send a command containing the converted character codes to the printer for use in printing;

wherein the web browser is configured to generate print data based on the converted character codes and forward the print data to the printer for use in printing.

\* \* \* \* \*